US007926089B2

(12) United States Patent
Tulshibagwale et al.

(10) Patent No.: US 7,926,089 B2
(45) Date of Patent: Apr. 12, 2011

(54) ROUTER FOR MANAGING TRUST RELATIONSHIPS

(75) Inventors: Atul Vijay Tulshibagwale, Cupertino, CA (US); Gregory Ryan Whitehead, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1158 days.

(21) Appl. No.: 11/486,684

(22) Filed: Jul. 14, 2006

(65) Prior Publication Data

US 2008/0016195 A1     Jan. 17, 2008

(51) Int. Cl.
  *G06F 15/173*     (2006.01)
(52) U.S. Cl. ............... 726/4; 726/5; 726/18; 726/21; 709/225
(58) Field of Classification Search ............. 726/4, 8, 726/12, 5, 18, 21; 709/223, 225; 713/153
See application file for complete search history.

(56) References Cited

U.S. PATENT DOCUMENTS

| | | | |
|---|---|---|---|
| 2002/0111876 A1* | 8/2002 | Rudraraju et al. | 705/26 |
| 2003/0023880 A1 | 1/2003 | Edwards et al. | |
| 2004/0122961 A1 | 6/2004 | Rouault | |
| 2004/0128542 A1* | 7/2004 | Blakley et al. | 713/201 |
| 2004/0128546 A1* | 7/2004 | Blakley et al. | 713/201 |
| 2007/0143829 A1* | 6/2007 | Hinton et al. | 726/5 |
| 2007/0184819 A1* | 8/2007 | Barriga-Caceres et al. | 455/411 |

OTHER PUBLICATIONS

Joseph Pato, et al., "Identity Management: The Drive to Federation" White Paper, Aug. 2003, 1-8 pgs., Hewlett-Packard Development Company, US.
Jason Rouault, "Security Standards Developers and Architects Need to Know: Federal Identity" Invent Online, Aug. 21, 2003, 1-12 pgs., Hewlett-Packard Development Co., US.
HP Open View Select Federation, Architecture Guide, Software Version: 6.0, for HP-UX, Solaris, and Windows Operating Systems, Jan. 2005, 1-24 pgs., Trustgenix, Inc. and Hewlett-Packard Development Co., L.P. US.

* cited by examiner

*Primary Examiner* — Benjamin E Lanier
*Assistant Examiner* — Hadi Armouche

(57) ABSTRACT

One embodiment relates to a method of managing trust relationships between federated identity and service providers. An assertion of a user identity is received from an identity provider via a first federation protocol, wherein a destination service provider is indicated with the assertion. Permission of the user identity to access the destination service provider is verified. If permission is verified, the user identity is asserted to the destination service provider via a second federation protocol. Other embodiments and features are also disclosed.

13 Claims, 11 Drawing Sheets

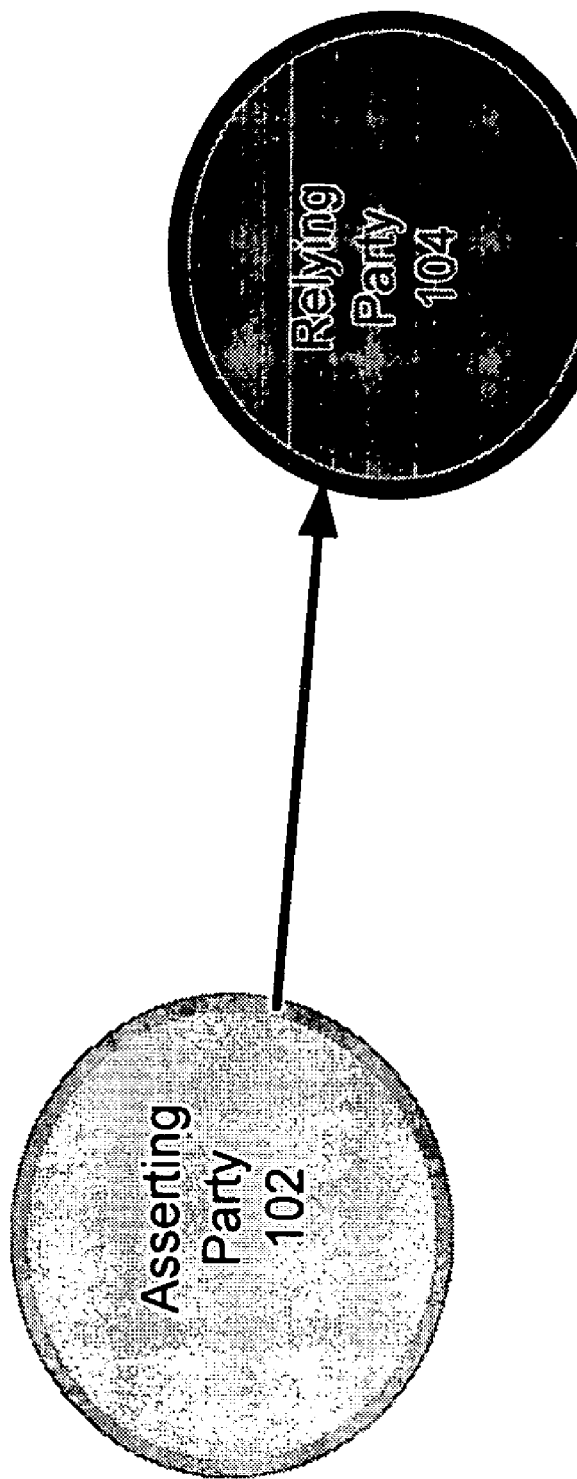
FIG. 1
(Conventional)

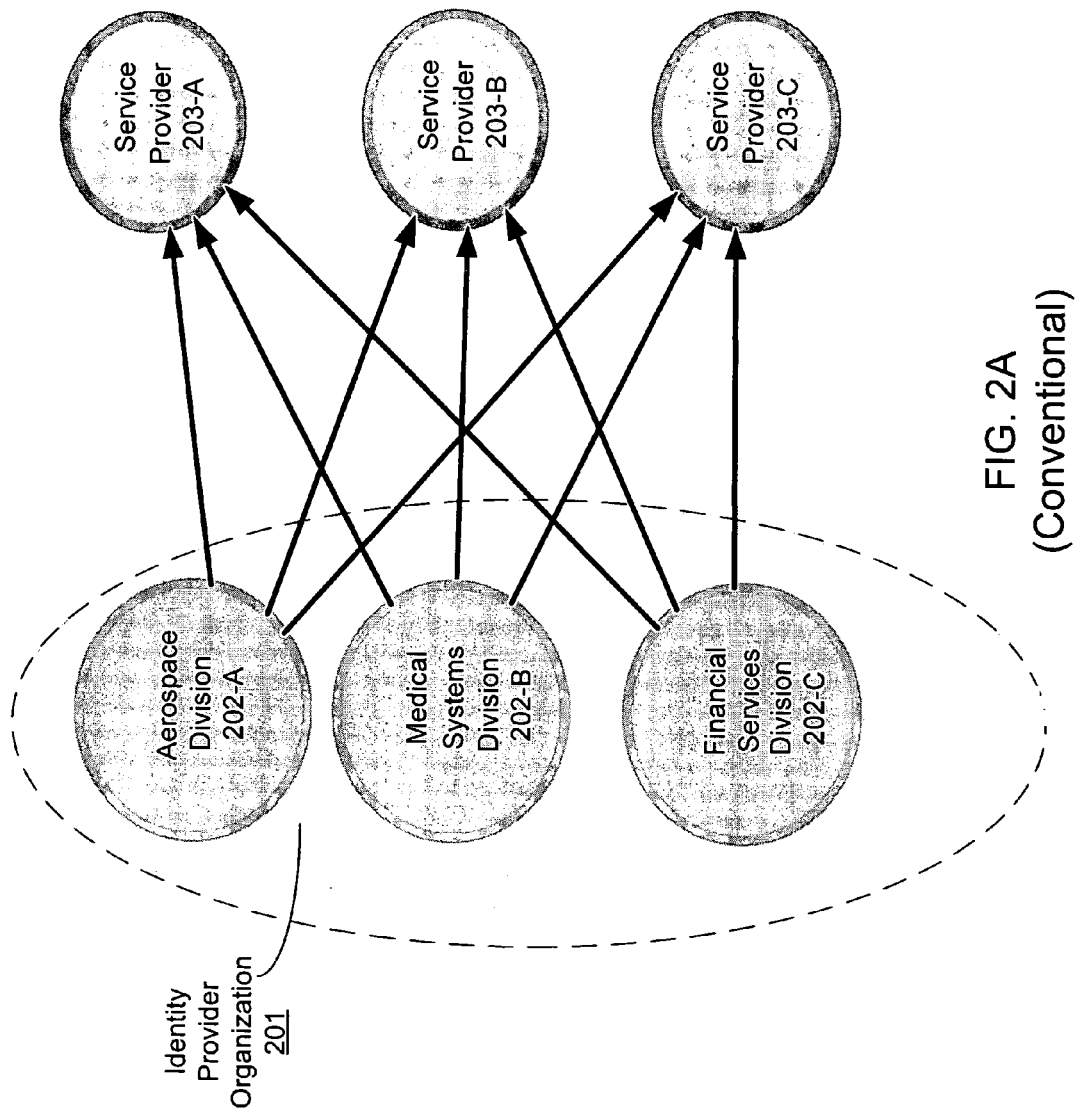
FIG. 2A
(Conventional)

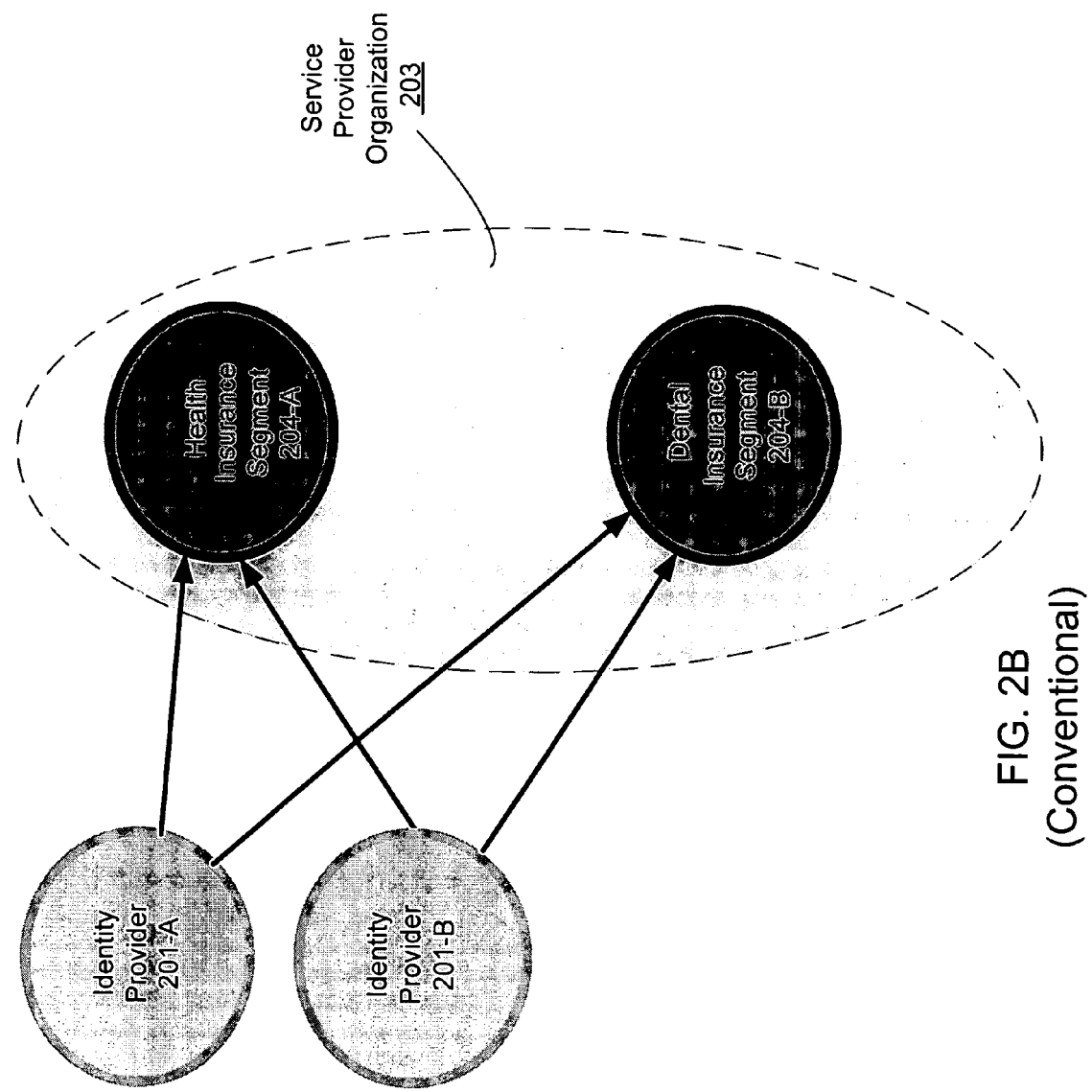
FIG. 2B
(Conventional)

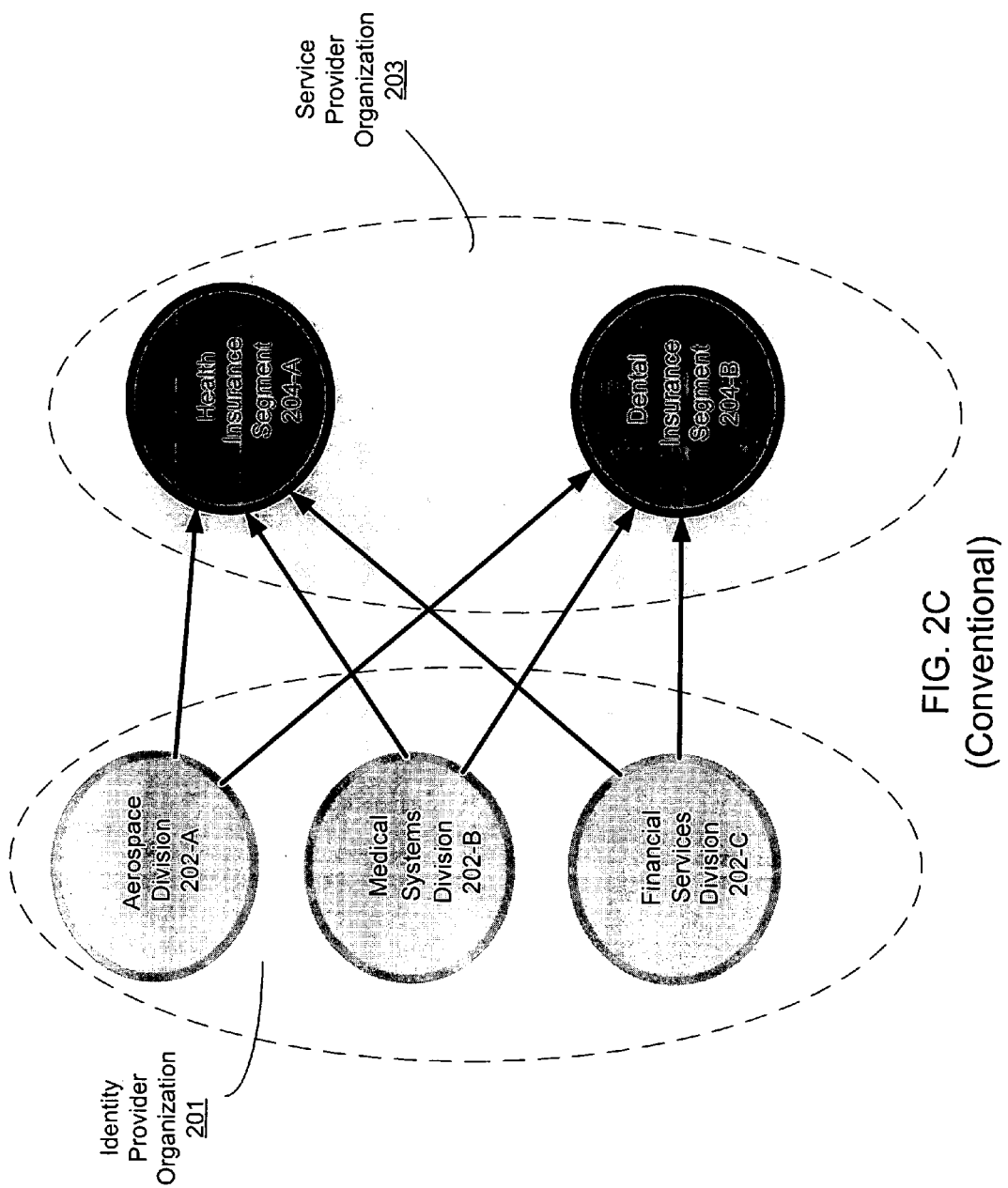
FIG. 2C
(Conventional)

ROUTER FOR MANAGING TRUST RELATIONSHIPS

BACKGROUND

1. Field of the Invention

The present application relates generally to data networking and computer software. More particularly, the present application relates to network identity management.

2. Description of the Background Art

A digital identity is a set of information about a user. The set of information may include, for example, identifiers (name, address, etc.), authenticators (social security number, etc.), and privileges (credit card numbers, etc.). Digital identity management is becoming increasingly complex and important in today's networked society.

There are various models for digital identity management. One model is based on a federated approach. Under this federated approach, there is no single entity operating as a centralized identity manager. Instead, support is provided for distributed storage and management of the identity information.

In a federated network, a "domain" may be defined as a group of connected computational devices that are administered as a unit with common rules and procedures. Domains include subjects that may be users or computer applications. Subjects may be authenticated by one domain of a federated network and be recognized and delivered personalized content and services in other domains of the federated network, without having to re-authenticate or sign on with a separate username and password. The identities of the users may be shared between the domains in order to provide a single sign on.

In a federated network, trust relationships exist between asserting and relying parties. FIG. 1 is schematic diagram depicting a trust relationship between an asserting party 102 and a relying party 104 in a federated network. Domains act as asserting parties to authenticate users and issue assertions about the identities of the authenticated users. Domains also act as relying parties which rely on the information provided by the asserting parties so as to allow users access to their resources and customize their behavior in user-specific ways. Each domain may trust multiple asserting parties, and each asserting party may provide authentication services to multiple relying parties.

It is highly desirable to improve methods, apparatus, and systems for network identity management. In particular, it is highly desirable to improve techniques for federated identity management.

SUMMARY

One embodiment relates to a method of managing trust relationships between federated identity and service providers. An assertion of a user identity is received from an identity provider via a first federation protocol, wherein a destination service provider is indicated with the assertion. Permission of the user identity to access the destination service provider is verified. If permission is verified, the user identity is asserted to the destination service provider via a second federation protocol.

Another embodiment of the invention relates to a router for managing trust relationships between federated identity and service providers. The router comprises a processor and memory, wherein the memory includes various computer-readable code, including the following: computer-readable code configured to receive an assertion of a user identity from an identity provider via a first federation protocol, wherein a destination service provider is indicated with the assertion; computer-readable code configured to verify permission of the user identity to access the destination service provider; computer-readable code configured to determine a second federation protocol which is compatible to the destination service provider, and computer-readable code configured to assert the user identity to the destination service provider via the second federation protocol.

Another embodiment of the invention relates to an apparatus for managing trust relationships between federated identity and service providers. The apparatus includes means for intercepting an assertion of a user identity from an identity provider, wherein a destination service provider is indicated with the assertion. The apparatus also includes means for checking permission of the user identity to access the destination service provider. The apparatus also includes means for constructing a view of the user identity for presentation to the destination service provider, and means for sending the constructed view of the user identity to the destination service provider.

Other embodiments are also disclosed.

BRIEF DESCRIPTION OF THE DRAWINGS

FIG. 1 is schematic diagram depicting a trust relationship.

FIG. 2A depicts a conventional model of trust relationships between an identity provider organization with multiple domains and multiple service providers.

FIG. 2B depicts a conventional model of trust relationships between multiple identity providers and a service provider organization with multiple domains.

FIG. 2C depicts a conventional model of trust relationships between an identity provider organization with multiple domains and a service provider organization with multiple domains.

DETAILED DESCRIPTION

Figure 3A:
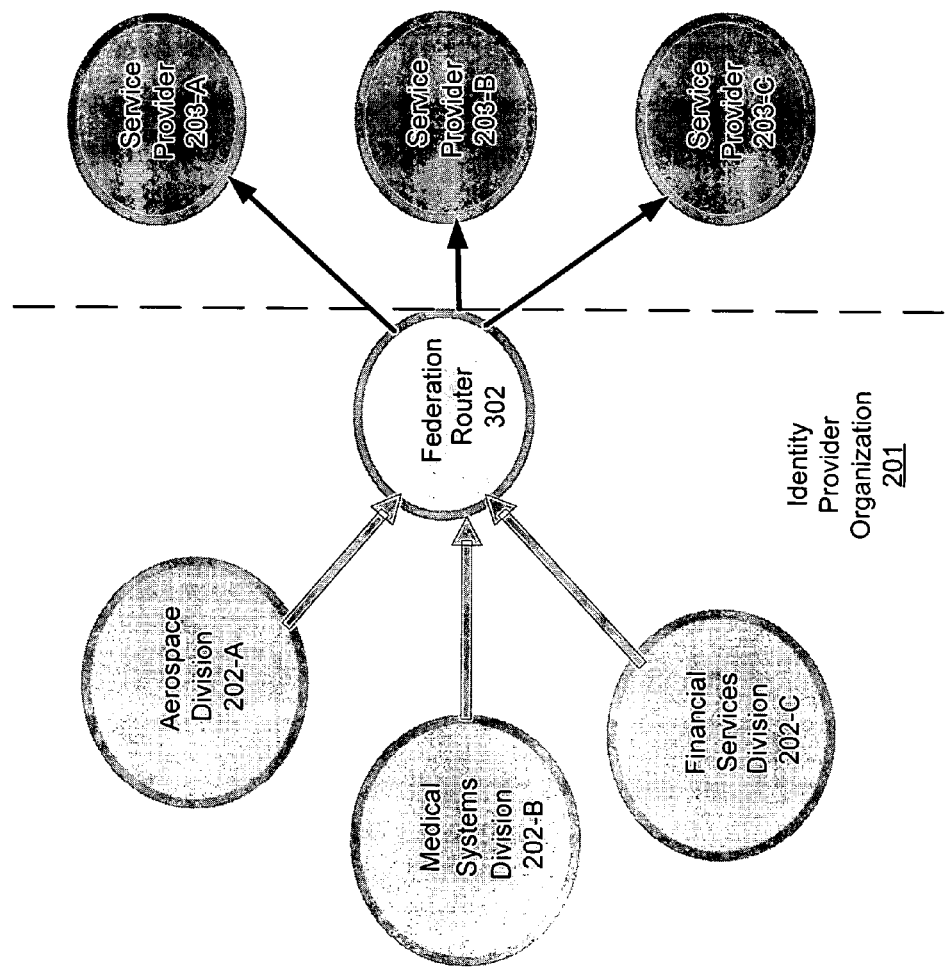
FIG. 3A depicts trust relationships when there is a federation router at an identity provider organization with multiple domains in accordance with an embodiment of the invention.

I. Conventional Point-to-Point Model of Trust Relationships

Today, federated networks exist between organizations and their business partners. For example, an organization may have one or more asserting parties for one or more resources provided by its business partners or by other domains in the organization itself.

In the present state of technology, the model of trust relationships between organizations and business partners is point-to-point. In other words, every domain in an organization has a trust relationship with one or more domains in one or more business partners.

The point-to-point model of trust relationships makes the management of trust relationships in federated networks very complex. As the internal federated networks of both the organization and its business partners grow more complex, the number of trust relationship to be maintained increases enormously. The following sections discuss three examples showing how the number of trust relationships grows dramatically under the conventional point-to-point model.

A. Multiple Domains at Identity Provider Organization

FIG. 2A depicts a conventional model of trust relationships between an identity provider organization (IPO) with multiple domains and multiple service providers. In the illustrated example, an IPO network 201 includes multiple separate domains 202. The domains 202 may correspond to divisions or other groupings in the organization. The specific example in FIG. 2A depicts an aerospace division domain 202-A, a medical systems division domain 202-B, and a financial services domain 202-C. In FIG. 2A, three domains in the IPO are shown, but the number of domains in the organization may be more than or less than three. Other organizations may have different domains. As another illustrative example, the domains may include a research group domain, a marketing group domain, a finance group domain, and an information technology domain.

For such an IPO, each domain 202 may have a separate trust relationship with each of multiple service providers 203. In FIG. 2A, three service providers (203-A, 203-B, and 203-C) are shown, but the number of service providers may be more than or less than three.

If the number of domains within the IPO is defined as M, and the number of service providers is defined as N, then the number of separate trust relationships needed under this conventional model is M times N (M×N). As seen in the specific example of FIG. 2A, if M is three and N is three, then the number of separate trust relationships needed between the various domains is nine.

B. Multiple Domains at Service Provider Organization

FIG. 2B depicts a conventional model of trust relationships between multiple identity providers and a service provider organization (SPO) with multiple domains. In the illustrated example, a SPO network 203 includes multiple separate domains 204. The domains 204 may correspond to segments or other groupings in the organization. The specific example in FIG. 2B depicts a benefits provider network with a health insurance domain 204-A, and a dental insurance domain 204-B. In FIG. 2B, two domains of the SPO are shown, but the number of domains in the organization may be more than or less than two. Other organizations may have different domains.

For such a SPO, each domain 204 may have a separate trust relationship with each of multiple identity providers 201. In FIG. 2B, two identity providers (201-A and 201-B) are shown, but the number of identity providers 201 may be more than or less than two.

If the number of domains within the SPO is defined as P, and the number of identity providers is defined as Q, then the number of separate trust relationships needed under this conventional model is P times Q (P×Q). As seen in the specific example of FIG. 2B, if P is two and Q is two, then the number of separate trust relationships needed between the various domains is four.

C. Multiple Domains at Both Identity Provider Organization and Service Provider Organization FIG. 2C depicts a conventional model of trust relationships between an IPO with multiple domains and a SPO with multiple domains. In the illustrated example, an IPO 201 includes multiple domains 202 and a SPO 203 includes multiple domains 204. The specific example in FIG. 2C depicts three domains of the IPO and two domains of the SPO are shown, but the number of domains may vary. Further, FIG. 2C only shows the trust relationships between a single IPO and a single SPO. Naturally, the IPO may have trust relationships with other service providers, and the SPO may have trust relationships with other identity providers.

If the number of domains within the IPO is defined as R, and the number of domains in the SPO is defined as S, then the number of separate trust relationships needed under this conventional model is R times S (R×S). As seen in the specific example of FIG. 2C, if R is three and S is two, then the number of separate trust relationships needed between the various domains is six.

II. Managing Trust Relationships Using Federation Routers

The above-discussed examples illustrate how the number of trust relationships grows dramatically under the conventional point-to-point model. The following discusses how a federation router enables an improved model of trust relationships which can dramatically reduce the number of trust relationships needed between organizations.

A. Federation Router at Identity Provider Organization

FIG. 3A depicts trust relationships when there is a federation router at an IPO with multiple domains in accordance with an embodiment of the invention. As shown in the figure, the IPO network 201 is now arranged so as to include multiple separate domains 202 and a federation router 302.

The federation router 302 may be configured as an intermediary between the domains 202 within the IPO network 201 and external service provider domains 203. For example, as shown in FIG. 3A, the federation router 302 may be configured so that each of the multiple service providers 203 has a single trust relationship with the IPO network 201.

If the number of domains within the IPO is defined as M, and the number of service providers is defined as N, then the number of separate trust relationships needed using an IPO federation router is simply N. This is because there is a single trust relationship needed between the federation router 302 and each service provider 203. In contrast, the conventional point-to-point model requires M×N trust relationships. Thus, it is seen how a federation router at an IPO substantially reduces the number of required trust relationships with external service providers.

B. Federation Router at Service Provider Organization

Figure 3B:
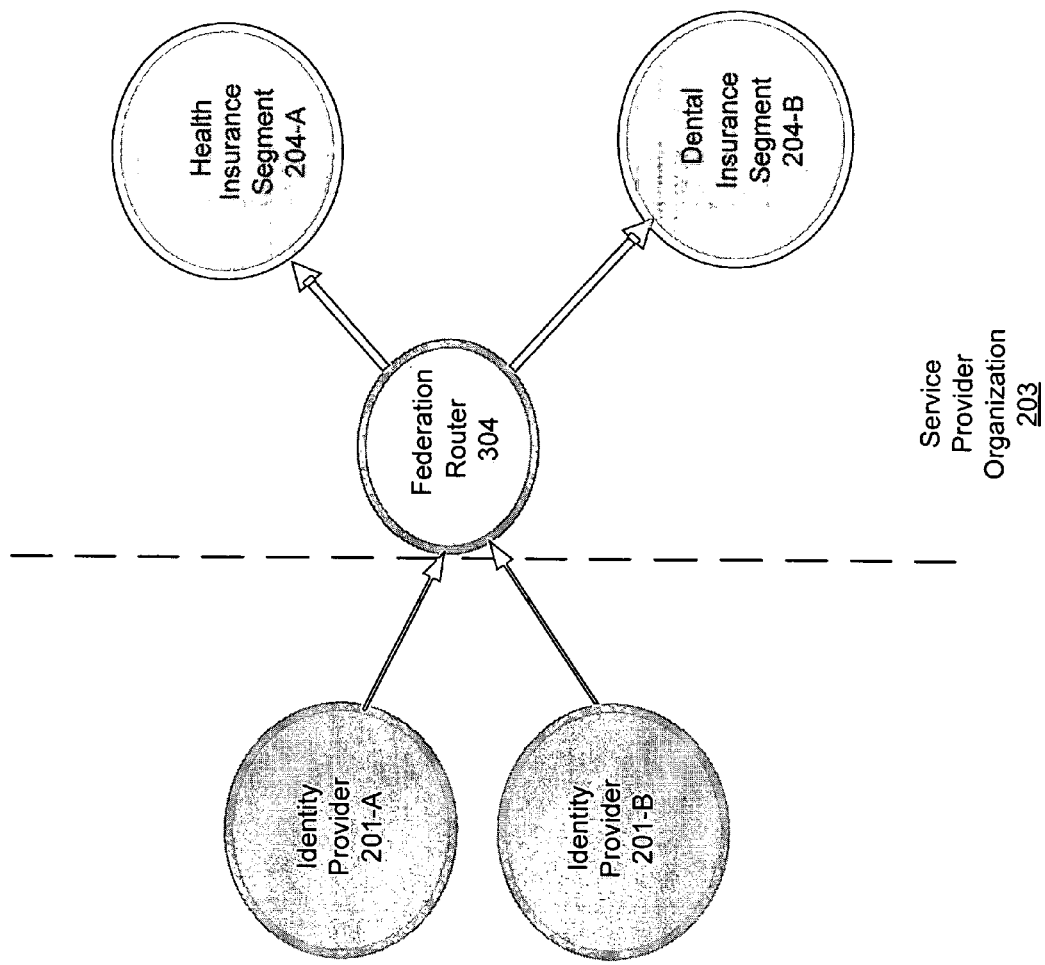
FIG. 3B depicts trust relationships when there is a federation router at a service provider organization with multiple domains in accordance with an embodiment of the invention.

FIG. 3B depicts trust relationships when there is a federation router at a SPO with multiple domains in accordance with an embodiment of the invention. As shown in the figure, the SPO network 203 is now arranged so as to include multiple separate domains 204 and a federation router 304.

The federation router 302 may be configured as an intermediary between the domains 202 within the IPO network 201 and external service provider domains 203. Similarly, the federation router 304 may be configured as an intermediary between the domains 204 within the SPO network 203 and external identity provider domains 201. For example, as shown in FIG. 3B, the federation router 304 may be configured so that each of the multiple identity providers 201 has a single trust relationship with the SPO network 203.

If the number of domains within the SPO is defined as P, and the number of identity providers is defined as Q, then the number of separate trust relationships needed using a SPO federation router is simply Q. This is because there is a single trust relationship needed between the federation router 304 and each identity provider 201. In contrast, the conventional point-to-point model requires P×Q trust relationships. Thus, it is seen how a federation router at a SPO substantially reduces the number of required trust relationships with external identity providers.

Figure 3C:
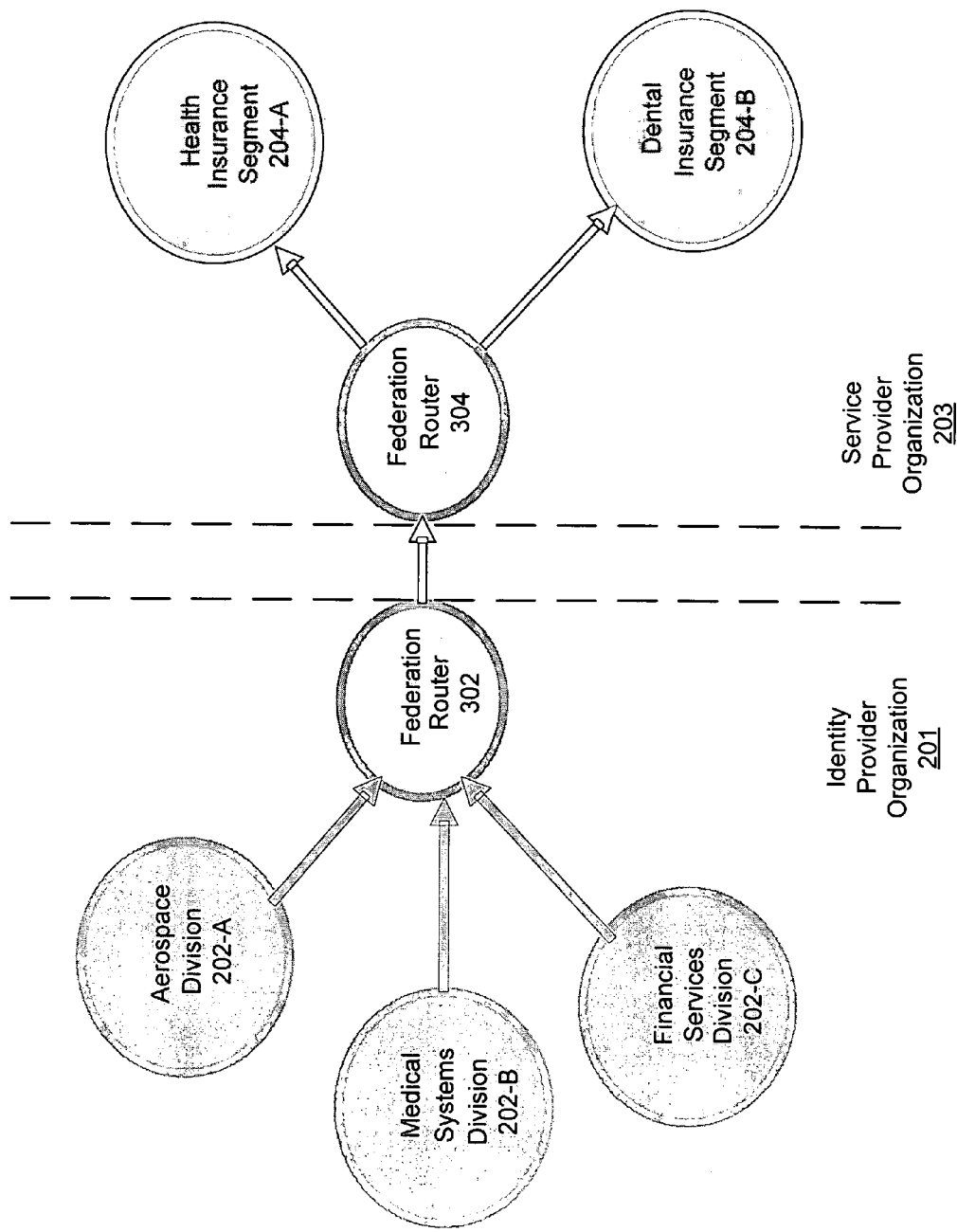
FIG. 3C depicts trust relationships when there is a federation router at a first (identity provider) organization with multiple domains and another federation router at a second (service provider) organization with multiple domains in accordance with an embodiment of the invention.

C. Federation Routers at Both Identity Provider Organization and Service Provider Organization FIG. 3C depicts trust relationships when there is a federation router at a first (Identity provider) organization with multiple domains and another federation router at a second (service provider) organization with multiple domains in accordance with an embodiment of the invention. Here, the IPO network 201 includes multiple separate domains 202, and the SPO network 203 also includes multiple separate domains 204. Moreover, as shown in the figure, the IPO network 201 is now arranged so as to include a federation router 302, and the SPO network 203 is now arranged so as to include a federation router 304.

The IPO federation router 302 may be configured as an intermediary between the domains 202 within the IPO network 201 and external service provider domains 203. Similarly, the SPO federation router 304 may be configured as an intermediary between the domains 204 within the SPO network 203 and external identity provider domains 201. In FIG. 3C, only one IPO network 201 and one SPO network 203 are shown for purposes of ease of illustration and explanation.

If the number of domains within the IPO is defined as R, and the number of domains in the SPO is defined as S, then the number of separate trust relationships needed using both an IPO federation router and a SPO federation router is only R+S. This is because there is a single trust relationship needed between the IPO federation router 302 and the SPO federation router 304. In contrast, the conventional point-to-point model requires R×S trust relationships. Thus, it is seen how federation routers at both an IPO network and a SPO network substantially reduces the number of required trust relationships between the two organizations.

III. Network Identity Methods with Federation Routers

Figure 4:
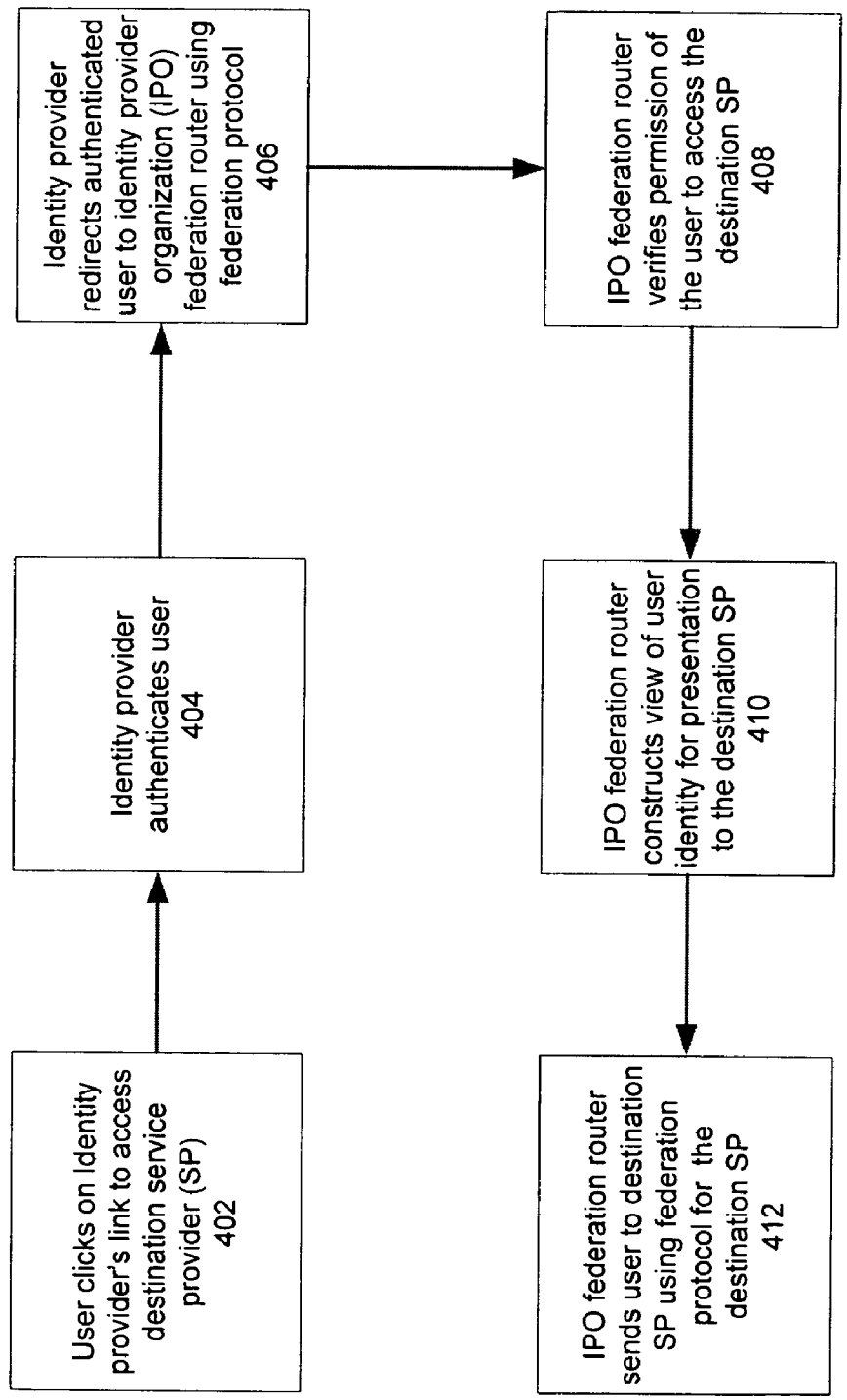
FIG. 4 is a flow chart of a method in which a federation router performs intermediary steps to act as a consolidated identity provider to external service providers in accordance with an embodiment of the invention.

FIG. 4 is a flow chart of a method 400 in which a federation router acts as a consolidated identity provider to external service providers in accordance with an embodiment of the invention. This method 400 may be performed using a federation router 302 at an identity provider organization 201, for example, such as depicted in FIGS. 3A and 3C.

Note that, while the federation router 302 in the following discussion is configured to act as a consolidated identity provider (asserting party), the same federation router 302 may also be configured to act as a consolidated service provider (relying party).

In accordance with this method 400, a user may open a web browser and navigate to a website of the identity provider. For example, the user may be an employee of the identity provider, and the identity provider may be a particular division (for example, medical systems division 202-B) of a larger identity provider organization 201 (for instance, a large industrial conglomerate). The website of the identity provider may include a link to access a destination service provider 203. The user may "click" on the link to the destination service provider 203 (see step 402). The destination service provider 203 may be, for instance, a benefits provider.

A computer (server) of the IPO authenticates the user (see step 404). This may involve, for example, verifying that the username and password is correct for that user identity. The user is typically not allowed to proceed until and unless the authentication is successful. Once the user is authenticated, the identity provider computer (server) may redirect the user to a federation router 302 of the identity provider organization 201 (see step 406). A standard federation protocol may be used.

The IPO federation router 302 may then verify permission of the user to access the destination service provider 203 (see step 408). In other words, the IPO federation router 302 verifies that the user is allowed to visit the destination service provider 203 according to policy rules and data. The user is typically not allowed to access the destination service provider 203 until and unless the permission verification is successful.

Once the permission is verified, the IPO federation router 302 may then construct a view of the user identity that is appropriate for presentation to the destination service provider 203 (see step 410). The view of the user identity may select profile attributes, web-service related information, and other data which is appropriate for the particular destination service provider 203.

Once the appropriate user view is generated, then the IPO federation router 302 may send the user to the destination service provider 203 (see step 412). This may be done using a federation protocol appropriate to (i.e. understood by) the destination service provider 203. The appropriate federation protocol is determined by the IPO federation router 302.

The federation protocol used by the IPO federation router 302 to communicate the user to the destination service provider 203 in step 412 may be different from the federation protocol used by the identity provider computer to communicate the user to the federation router 302 in step 406. In some instances, these federation protocols (used in steps 406 and 412) may be the same.

Figure 5:
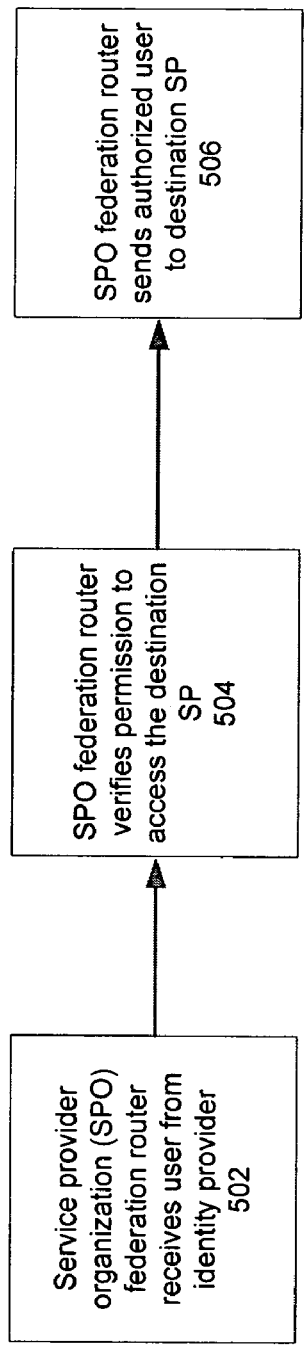
FIG. 5 is a flow chart of a method in which a federation router performs intermediary steps to act as a consolidated service provider to external identity providers in accordance with an embodiment of the invention.

FIG. 5 is a flow chart of a method 500 in which a federation router acts as a consolidated service provider to external identity providers in accordance with an embodiment of the invention. This method 500 may be performed using a federation router 304 at a service provider organization (SPO) 203, for example, such as depicted in FIGS. 3B and 3C.

Note that, while the federation router 304 in the following discussion is configured to act as a consolidated service provider (relying party), the same federation router 304 may also be configured to act as a consolidated identity provider (asserting party).

In accordance with this method 500, a federation router 304 at a service provider organization 203 may receive a user from an identity provider 201 (see step 502). For example, the user may be an employee of the identity provider. The service provider organization 203 may be, for instance, a benefits provider with a health insurance segment 204-A and a dental insurance segment 204-B. The federation protocol used to receive the user may also indicate, for instance, that the user wishes to access private information at the dental insurance segment 204-B. In this instance, the dental insurance segment 204-B is the destination service provider 204.

The SPO federation router 304 may then verify permission (authorization) of the user to access the destination service provider 204 (see step 504). In other words, the SPO federation router 304 verifies that the user is allowed to visit the destination service provider 204 according to policy rules and data. The user is typically not allowed to access the destination service provider 204 until and unless the permission verification is successful.

Once the permission is verified, the SPO federation router 304 may then send the authorized user to the destination service provider 204 (see step 506). This may be done using a federation protocol appropriate to (i.e. understood by) the destination service provider 204. The appropriate federation protocol is determined by the SPO federation router 304.

The federation protocol used by the federation router 304 to communicate the user to the destination service provider 204 in step 506 may be different from the federation protocol used by the SPO federation router 304 to receive the user in step 502. In some instances, these federation protocols (used in steps 502 and 506) may be the same.

Figure 6:
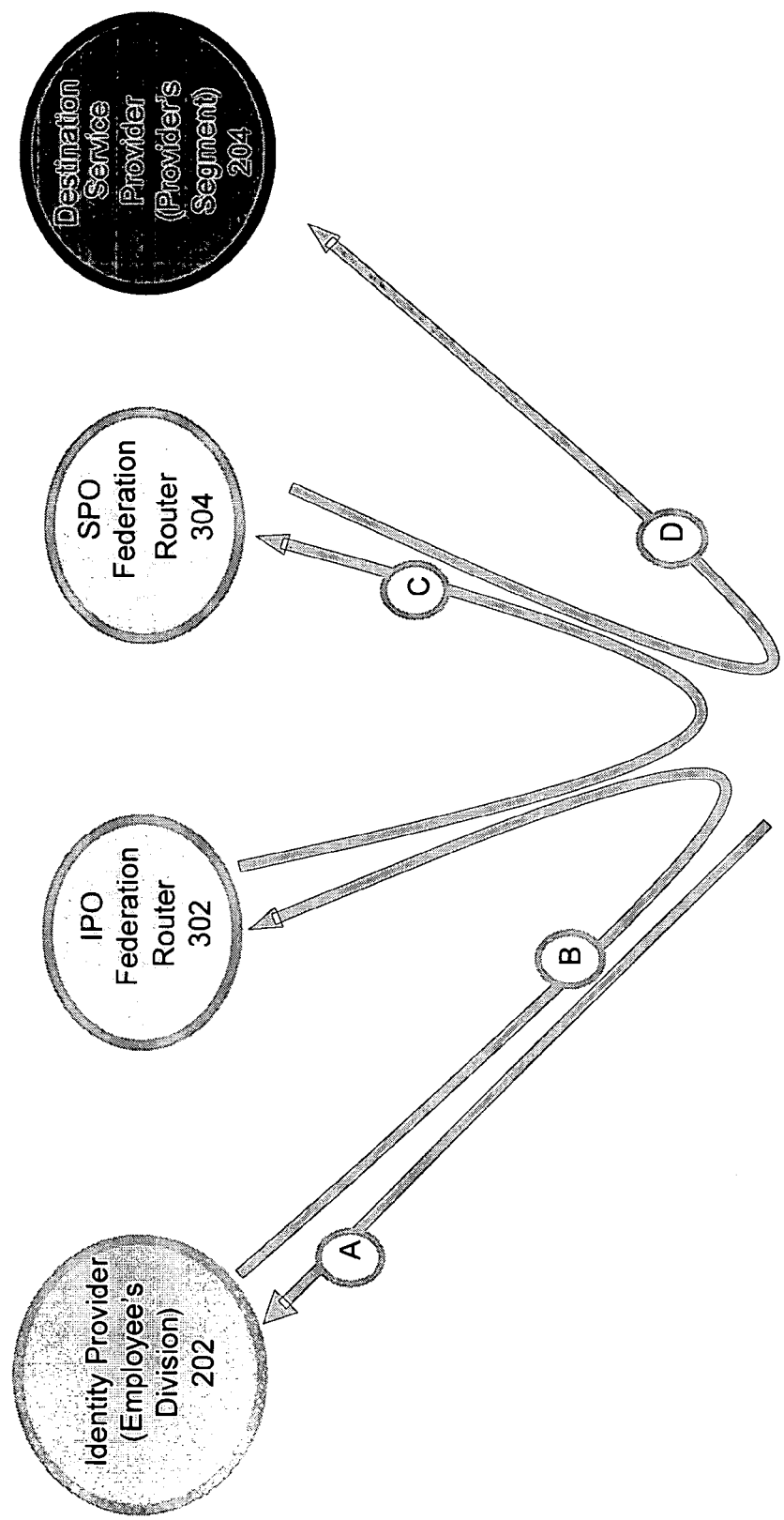
FIG. 6 is a schematic diagram depicting steps in a process when there is a federation router at a first (identity provider) organization with multiple domains and another federation router at a second (service provider) organization with multiple domains in accordance with an embodiment of the invention.

FIG. 6 is a schematic diagram depicting steps in a process when there is a federation router 302 at a first (identity provider) organization 201 with multiple domains and another federation router 304 at a second (service provider) organization 203 with multiple domains in accordance with an embodiment of the invention. This schematic diagram may pertain, for example, to the situation shown in FIG. 3C.

In action A, the user "clicks" on the link from the identity provider 202 (for example, a division of the IPO 201) to visit the destination service provider 204 (for example, a segment of the SPO 204). This action A corresponds to step 402 in FIG. 4.

The identity provider 202 (more specifically, a computer or server system at the identity provider 202) authenticates the user. If the user is authenticated, then, in action B, the identity provider 202 redirects the authenticated user to the IPO federation router 302. This action B involves asserting the authenticated user identity. Action B corresponds to step 406 in FIG. 4.

The IPO federation router 302 verifies permission (authorization) of the user to access the destination service provider. If the user permission is verified, then, in action C, the IPO federation router 302 redirects an appropriate view of the authorized user towards the destination service provider 204. This action C involves further asserting the authenticated user identity. Action C corresponds to step 412 in FIG. 4. In this specific case, the SPO federation router 304 acts as an intermediary for the destination service provider 204.

The SPO federation router 304 verifies permission (authorization) of the user to access the destination service provider 204. If the user permission is verified, then, in action D, the SPO federation router 304 sends the user to the destination service provider 204. This action D involves further asserting the authenticated user identity. Action D corresponds to step 506 in FIG. 5.

As mentioned above, the actions B, C, and D may use different federation protocols to communicate the user information.

Note that federation routers may be nested. In other words, a large organization may have multiple layers of federation routers to efficiently manage trust relationships.

Figure 7:
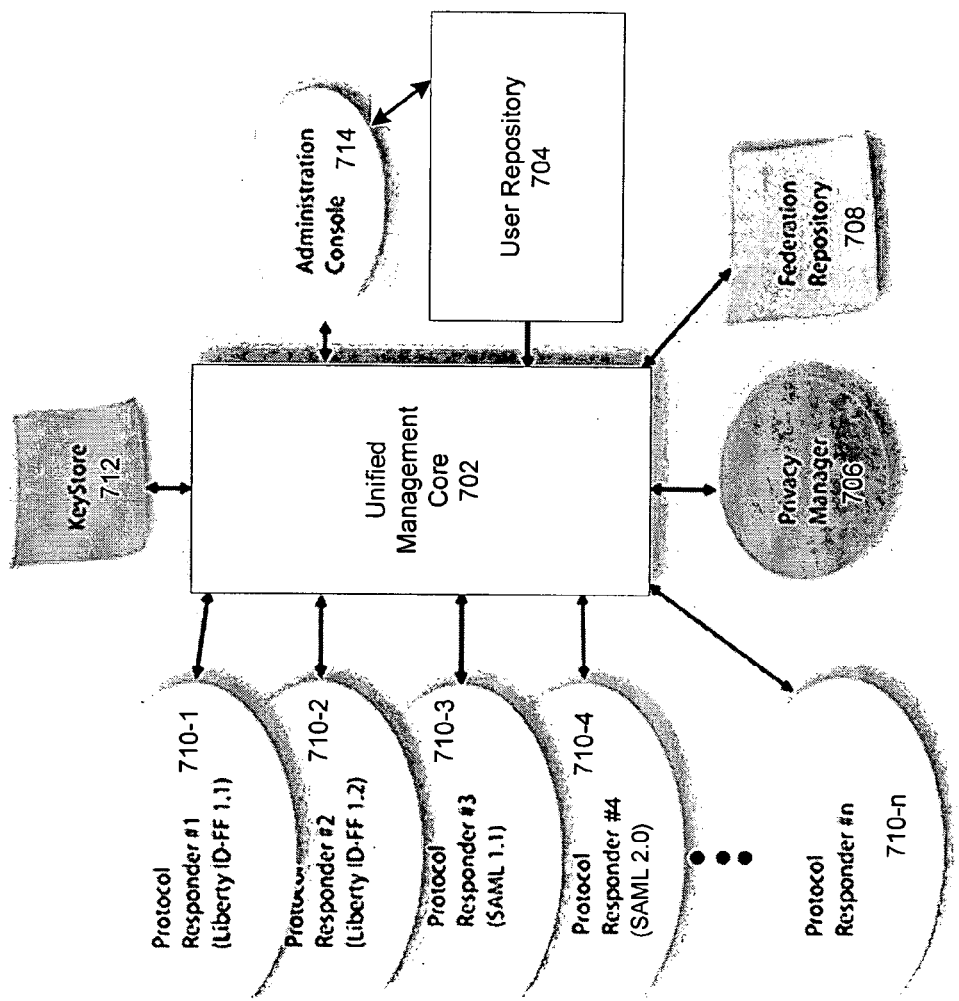
FIG. 7 is a schematic diagram of an architecture for computer-readable code which may be adapted to implement an embodiment of the invention.

FIG. 7 is a schematic diagram of an architecture of modules which may be adapted to implement an embodiment of the invention. The modules shown include a unified management core 702, a user repository 704, a privacy manager 706, a federation repository 708, protocol responders 710-1, 710-2, 710-3, 710-4, . . . , 710-n, a key store 712, and an administrative console 714. These modules may be implemented, for example, using computer-readable code to be executed by one or more processors.

The unified management core 702 may be configured to manage the user-federation-session information, federation mappings of user identities, circle-of-trust information regarding trusted partner sites, and audit events. The user management core 702 may be configured to store such federation-related information at the federation repository 708. The federation repository 708 may be implemented, for example, as a relational database.

The user repository 704 may be configured to store user authentication and user profile information. The user repository 704 may be referenced by the unified management core 702 for profile attributes of users and for verifying membership for privileged access to external applications. The privacy manager 706 may be configured to allow users to control the exchange of their personal attributes and to control their preferences about exchanging such information between trusted sites.

The protocol responders 710 may be implemented, for example, as servlets configured to receive messages from either (a) a user-agent, such as a browser, on a "front channel", or (b) a Federation server on a "back channel." Examples of "front channel" universal resource locators (URLs) include the SAML Single Sign-On Service URL and the Liberty Assertion Consumer Service URL. Examples of "back-channel" Web-services include the SAML Attribute Authority Service and the Liberty Profile Service.

The key store 712 may be implemented, for example as a Java Cryptography Architecture compliant key store. The key store 712 may be implemented in either computer-readable code (software), or in circuitry (hardware).

The administrative console 714 may be implemented, for example, as a web-front-end interface. The administrative console 714 may be configured to connect to both the unified management core 702 and the user repository 704. The administrative console 714 may be configured to allow a root administrator to monitor existing federations with trusted partners, including capabilities such as defining trusted sites, manually deleting user federations, and viewing an audit log.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of managing trust relationships between federated identity and service providers, the method comprising:

receiving an assertion of a user identity from an identity provider of a plurality of identity providers, wherein each of the identity providers comprises a separate domain, via a first federation protocol from a first intermediary federation router configured as a consolidated identity provider of said plurality of identity providers, wherein the first intermediary federation router has a single trust relationship with each of said plurality of identity providers, wherein a destination service provider of a plurality of destination service providers is indicated with the assertion, verifying permission of the user identity to access the destination service provider; and asserting the user identity to the destination service provider of said plurality of service providers, wherein each of the service providers comprises a separate domain, via a second federation protocol from a second intermediary federation router configured as a consolidated destination service provider of said plurality of destination service providers, such that said plurality of identity providers has a single trust relationship with said plurality of destination service providers only through said first intermediary federation router and said second intermediary router.

2. The method of claim 1, further comprising, prior to asserting the user identity, constructing a view of the user identity for presentation to the destination service provider.

3. The method of claim 1, further comprising:
determining an appropriate federation protocol which is compatible with the destination service provider; and
selecting the appropriate federation protocol to be the second federation protocol.

4. The method of claim 1, wherein the first and second federation protocols comprise different protocols.

5. The method of claim 1, wherein the first and second federation protocols comprise a same protocol.

6. The method of claim 1, wherein assertions of user identities are received from multiple domains of an organization.

7. The method of claim 1, wherein assertions of user identities are sent to multiple domains within an organization.

8. A system for managing trust relationships between federated identity and service providers, the system comprising a processor and memory, wherein the memory includes:
computer-readable code configured to receive an assertion of a user identity from an identity provider via a first federation protocol from a first intermediary federation router configured as a consolidated identity provider of said plurality of identity providers, wherein each of the identity providers comprises a separate domain, wherein the first intermediary federation router has a single trust relationship with each of said plurality of identity providers, and wherein a destination service provider of a plurality of destination service providers is indicated with the assertion,
computer-readable code configured to verify permission of the user identity to access the destination service provider;
computer-readable code configured to determine a second federation protocol which is compatible to the destination service provider; and
computer-readable code configured to assert the user identity to the destination service provider of said plurality of service providers, wherein each of the service providers comprises a separate domain, via the second federation protocol from a second intermediary federation router configured as a consolidated destination service provider of said plurality of destination service providers, such that said plurality of identity providers has a single trust relationship with said plurality of destination service providers only through said first intermediary federation router and said second intermediary router.

9. The system of claim 8, wherein the memory further includes computer-readable code configured to generate a view of the user identity for presentation to the destination service provider.

10. The system of claim 8, wherein the first and second federation protocols comprise different protocols.

11. The system of claim 8, wherein the first and second federation protocols comprise a same protocol.

12. The system of claim 8, wherein the system is configured to receive assertions of user identities from multiple domains of an organization.

13. The system of claim 8, wherein the system is configured to send assertions of user identities to multiple domains within an organization.

* * * * *

UNITED STATES PATENT AND TRADEMARK OFFICE
CERTIFICATE OF CORRECTION

| | |
|---|---|
| PATENT NO. | : 7,926,089 B2 |
| APPLICATION NO. | : 11/486684 |
| DATED | : April 12, 2011 |
| INVENTOR(S) | : Atul Vijay Tulshibagwale et al. |

It is certified that error appears in the above-identified patent and that said Letters Patent is hereby corrected as shown below:

In column 9, line 4, in Claim 1, delete "assertion," and insert -- assertion; --, therefor.

In column 10, line 7, in Claim 8, delete "assertion," and insert -- assertion; --, therefor.

Signed and Sealed this
Twentieth Day of September, 2011

David J. Kappos
*Director of the United States Patent and Trademark Office*